Aug. 31, 1965 F. W. PFLEGER 3,203,693

DOCUMENT HANDLING SYSTEM

Filed Dec. 17, 1962 5 Sheets-Sheet 1

INVENTOR.
FREDERICK W. PFLEGER
BY John V. Regan
ATTORNEY

INVENTOR.
FREDERICK W. PFLEGER
BY John V. Regan
ATTORNEY

INVENTOR
FREDERICK W. PFLEGER
BY John V. Regan
ATTORNEY

Aug. 31, 1965 F. W. PFLEGER 3,203,693

DOCUMENT HANDLING SYSTEM

Filed Dec. 17, 1962 5 Sheets-Sheet 4

INVENTOR.
FREDERICK W. PFLEGER
BY John V. Regan
ATTORNEY

INVENTOR.
FREDERICK W. PFLEGER
BY
John V. Regan

United States Patent Office 3,203,693

Patented Aug. 31, 1965

3,203,693

DOCUMENT HANDLING SYSTEM

Frederick W. Pfleger, Cherry Hill, N.J., assignor to Radio Corporation of America, a corporation of Delaware Filed Dec. 17, 1962, Ser. No. 245,071

6 Claims. (Cl. 271—10)

This invention relates to document handling systems and, in particular, to document transport means for a demand feed system.

In a demand feed document system, documents are fed selectively, on demand, from an input hopper to a document processing station in response to a "demand feed" signal. The processing station may be a punch, reader, printer, or the like having a fixed time operating cycle during which a complete document may be processed. No document should be supplied to the processing station in the absence of a demand feed signal.

It generally is not practical to locate the input hopper too close to the processing station without expensive and excessive crowding of parts. For this reason, the problem arises of being able to feed a second document from the hopper to the processing station, on demand, after the processing of a first document, while still maintaining the timing of the processing station and without wasting a cycle of operation thereof.

It has been suggested that this problem be overcome by devoting a smaller portion of the operating cycle to processing, and devoting a correspondingly larger portion of the cycle to feeding a document from the hopper to the processing station. However, this requires a very high processing speed for the same rate of document handling, and there is an upper practical limit to the processing speed.

Another suggested solution to this problem is to feed the second document out of the hopper while the first document is still being processed, and to stop the feeder before the second document reaches the processing station if a "demand feed" signal is not received. Generally speaking, such a start-stop arrangement requires a large number of expensive components, and vibration is introduced in the apparatus together with undesired wear and tear.

Accordingly, it is one object of this invention to provide an improved demand feed apparatus which does not suffer the above disadvantages.

It is another object of this invention to provide a demand feed apparatus which permits the feeding of a second document from the input hopper to the processing station, on demand, after processing a first document, without reducing the document handling rate.

It is still another object of this invention to provide an improved demand feed apparatus in which a document may be fed from an input hopper to a processing station, on demand, after the complete processing of the previous document, while still maintaining the timing of the processing station and without wasting a cycle of operation thereof.

Yet another object of this invention is to provide an improved demand feed apparatus wherein documents may be fed from an input hopper to a processing station, on demand, without wasting a cycle of operation of the processing station and without requiring that the apparatus be stopped when no "demand feed" signal is received.

These and other objects are accomplished according to the invention by a document handling system having a two-speed document transport. First, relatively slow speed feed means feeds documents through the processing station at a fixed average output rate. A document is fed from a hopper or other storage means in response to a "demand feed" signal near the end of an operating cycle of the processing station. Relatively high speed means transports the document from the hopper to the processing station at such average speed as to maintain the average output rate aforesaid.

In the drawing, like reference characters refer to like components and:

FIGURES 1(*a*) and 1(*b*) are quasi timing diagrams showing the relative positions of documents as a function of time for a continuous feed system and for a demand feed system according to the invention, respectively;

In the general type of document handling system, the document processor, a document reader for example, has a fixed time operating cycle, whereby the first line of data storage positions on the document to be processed must arrive at the processing station at the proper point in the operating cycle. Also, the document must be moved through the processing station in timed relation to the operation of the station.

Because the operating cycle of the processing station has a fixed duration, it is necessary that a fixed interval or portion of the cycle be allotted between the time for normally processing the last line of data positions on one document and the time for processing the first line of data positions on an immediately succeeding document. Assuming that the distance between the last line and the trailing edge of a document is "$a$," and the distance between the leading edge of a document and the first line of data positions thereof is "$b$," this time interval may be made equal to the time it takes to feed a document a distance $a+b+c$, where "$c$" is the spacing between documents normally fed in succession. It is necessary that some time be allotted for decision making and transfer of information in the user equipment associated with the processing station. The inter-document spacing "$c$" is selected in accordance with the amount of decision making time required by the equipment.

In a demand feed system, the "demand feed" signal generally is generated during the aforementioned interval. If no "demand feed" signal is generated, however, the next document must be prevented from reaching the processing station. The problem encountered in such a system is one of being able to feed a document, on demand, from the input hopper during this interval and having that document arrive with its first line of data positions at the processing station, without reducing the effective rate of document processing, while still maintaining the timing of the system. This problem may be understood more clearly from a consideration of FIGURE 1.

Figure 1:
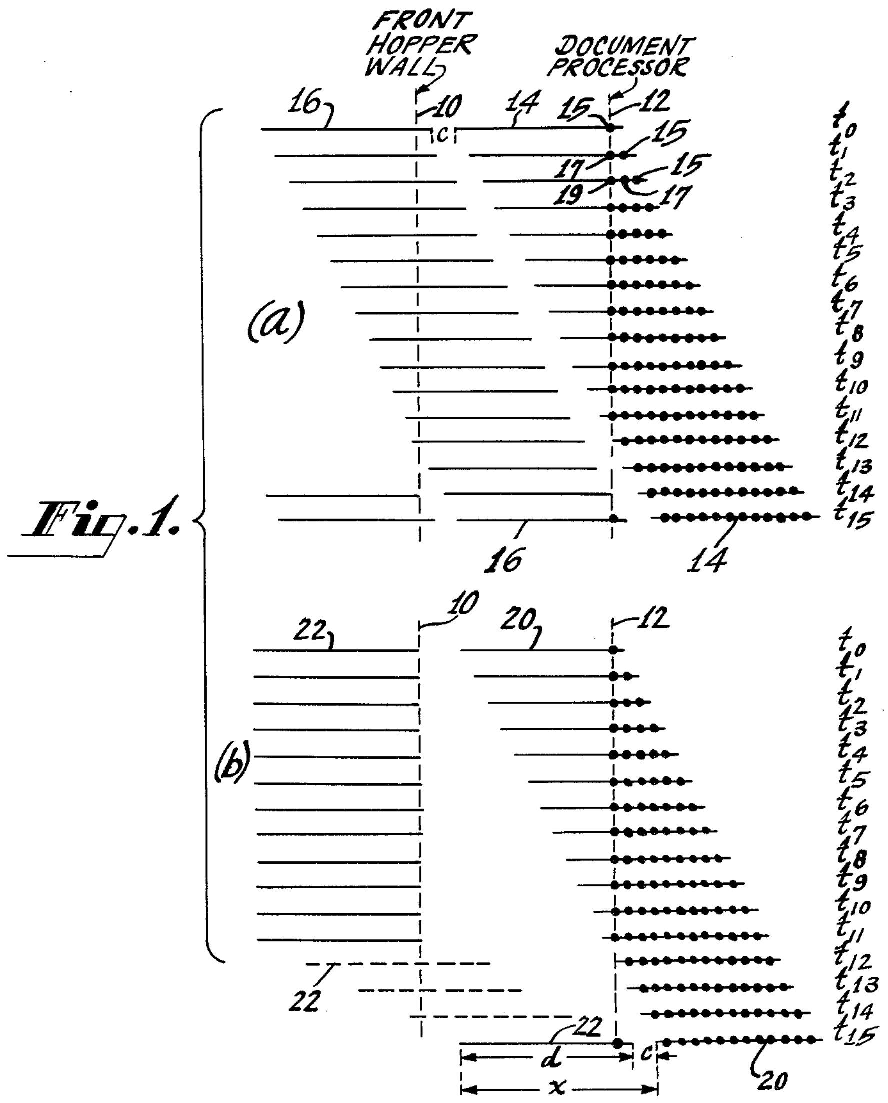

FIGURE 1(*a*) is a quasi timing diagram which shows the positions of documents relative to each other and to the hopper and document processor in the more general type of continuous feed system. FIGURE 1(*b*) is a similar type diagram for a demand feed system. In FIGURE 1(*a*) the vertical dashed lines 10, 12 represent, respectively, the front wall of a hopper and the center line of the data processor which, as mentioned previously, may be a reader, punch, card printer, or the like. It is assumed that the timing cycle begins at $t_0$ when the first document processor is conditioned to process the first line of data positions on a document.

The document may be, for example, an electronic accounting machine card of the Hollerith type having twelve rows and eighty columns of data storage positions. The card may be moved in a direction perpendicular to the rows, whereby an entire row of storage positions is presented to the processor at one time. At time $t_0$ the first row 15 of a first card 14 is in processing position. A second card 16 is spaced from the trailing edge of the first card 14 by a distance "*c*," which is equal to the aforementioned interdocument or intercard spacing. It will be noticed that the second card 16 has been partially fed out of the hopper at time $t_0$.

The second row 17 of the card 14 is in processing position at time $t_1$, the third row 19 is in processing position at time $t_2$, and so forth. The second card 16 always has the same position relative to the first card 14 and is moved in synchronism with card 14. Accordingly, at time $t_{15}$, which is the end of a processing cycle and the beginning of the next processing cycle, the first row of data positions on second card 16 is presented to the processor. There is no problem of maintaining synchronism in such a system since the mechanism which feeds the cards out of the hopper is operated continuously and in synchronism with the means for moving the card from the hopper to the processor and through the processor.

The problem which is encountered in a demand feed system, and the manner in which a demand feed system differs from that of a continuous feed system, may be seen in FIGURE 1(*b*). In FIGURE 1(*b*), a first card 20 is fed through the processor in synchronism with the operation thereof. The first row of the card 20 is present at the processor at time $t_0$, the second row is present at $t_1$, and so forth. Note, however, that the second card 22 is retained in the hopper until after the last row of data positions on card 20 is presented to the processor at time $t_{11}$. The demand feed signal generally is not generated until after time $t_{11}$. If a demand feed signal is then generated, it is desired that the second document 22 be fed out of the hopper so as to arrive at the processor with its first row of data positions presented to the processor at $t_{15}$, which is the beginning of the next operating cycle. Thus the second card 22 must be fed to the processor at a much greater average speed than the average speed at which a document is moved through the processor. This is accomplished according to the present invention by employing a two-speed document transport apparatus, to be described in greater detail, wherein the first transport means moves a document through the processor at a relatively slow average speed in synchronism with the operation of the processor. A second transport means moves a document from the hopper to the processor at a relatively high average speed in a short interval of time during which the first transport means moves a document a relatively short distance at the relatively slow average speed.

The positions of the document at $t_{12}$, $t_{13}$ and $t_{14}$ depend upon the time in the operating cycle at which a document is moved out of the hopper, the respective speeds of the different transport means, and other design considerations. For this reason, the second document 22 is shown in dashed lines at times $t_{12}$, $t_{13}$ and $t_{14}$. In any event, second document 22 is positioned with its first line of data storage positions presented to the processor at $t_{15}$. Note that at $t_{15}$ the first and second documents 20 and 22 are separated by the same interdocument spacing "*c*" as the documents 14 and 16 of FIGURE 1(*a*). Thus, as far as the document processor is concerned, the timing of the system is maintained and no cycle of operation is lost. Of course if no demand feed signal had been generated, second document 22 would have been held in the input hopper.

The transport system may be defined in mathematical terms as follows. Consider that the operating cycle is T seconds, measured from a time when the document processor is conditioned to process the first line of data storage positions of a document. A first transport means moves documents through the processor at a relatively low average speed of $X/T$ inches per second, where $X=c+d$, and $d$ is the dimension of a document in the direction of feed. A document is fed out of the hopper, on demand, at time $T_a$ in one operating cycle, the hopper being spaced from the processor at a distance greater than $$\frac{(T-T_a)X}{T}$$

inches. Second transport means feeds the document from the hopper to the processor at a relatively high average speed to arrive with its first line of data positions at the processor at the beginning of the next operating cycle.

Figure 2:
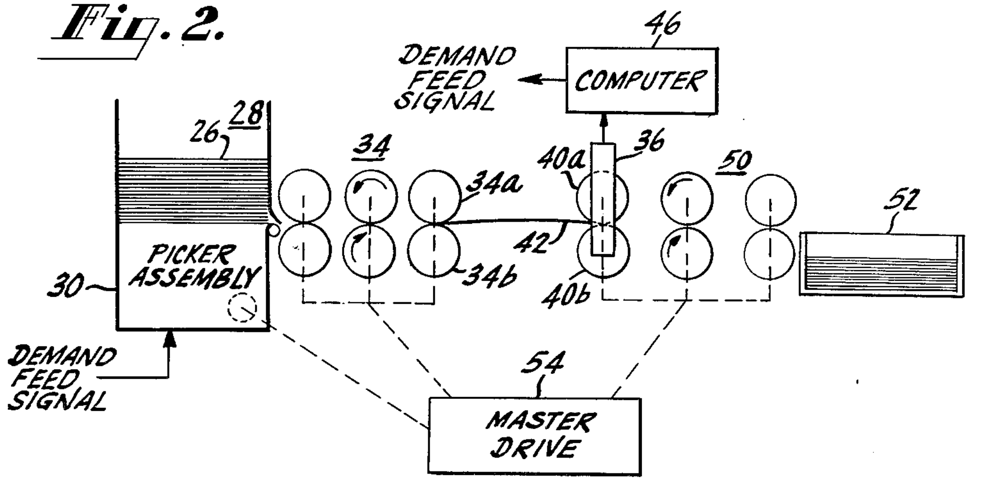
FIGURE 2 is a schematic diagram of a demand feed system according to the invention.

FIGURE 2 is a schematic view of a demand feed document system which includes a two-speed document transport according to the invention. The documents may be, for example, record cards, and this term will be used in the following discussion by way of illustration. However, this should not be construed as a limitation of the invention; it is to be understood that other types of documents also may be employed. Cards 26 to be processed are stored in an input hopper 28. Associated with the hopper 28 is a picker assembly 30 which is operative in response to a demand feed signal for feeding a card out of the hopper 28.

A number of sets of high speed drive rollers 34 are positioned along a path at the output side of the hopper 28 for feeding a card from the hopper 28 to a processing station 36, which may be a reader. A first set of relatively slow speed drive rollers 40*a*, 40*b* is positioned close to the reader 36 to receive a card 42 from the last set of high speed rollers 34*a*, 34*b*. The set of low speed rollers 40*a*, 40*b* acts to slow down the card 42 and present the card to the processing station 36 in synchronism with the operation thereof. The distance between the point of engagement of the card 42 with the high speed rollers 34*a*, 34*b* and the point of engagement of the card 42 with the relatively low speed rollers 40*a*, 40*b* is made slightly less than the dimension of the record card 42 in the direction of its feed. Because the card is being fed by rollers 34*a*, 34*b* at a higher speed than that of the slow speed rollers 40*a*, 40*b*, the card 42 has a slight buckle when it is in contact with both sets of rollers, thereby assuring proper pickup by the low speed rollers 40*a* and 40*b*.

A number of sets of slow speed rollers 50 receive the card as it emerges from the processing station 36, and feed the card to an output stacker 52. Assuming that the processing station 36 is a reader, information read from the card 36 is supplied to a computer 46 or other utilization device. Based on the information which is read from the card by the reader 36, the computer 46 may make a decision, after the last row of information is received, whether or not to call for another card from the hopper 28. If the decision is made to call for such a card, a demand feed signal is sent from the computer 46 to the picker assembly 30.

A master drive 54, which may be a motor (not shown) with suitable drive ratio means such as pulleys or gears (not shown), powers the picker assembly 30, the high speed rollers 34 and the low speed rollers 40*a*, 40*b* and 50. The processing station 36 can process only one card each operating cycle. Accordingly, the drive from the master drive 54 to the picker assembly 30 is such that the picker, to be described, may selectively engage and feed a card from hopper 28 only once during an operating cycle. The slow speed rollers 40*a*, 40*b* and 50 are driven at such a speed as to move a card through the processing station 36 in synchronism with the operation thereof.

The high speed rollers 34 are driven at a much higher speed than the slow speed rollers, assuming that they are of the same diameter. Alternatively, the high speed rollers can be driven at the same angular velocity as the slow speed rollers if the diameters of the high speed rollers 34 are made larger than the diameters of the slow speed rollers. In any event, the high speed rollers 34 are driven at such a speed as to move a record card at a greater average speed than the slow speed rollers, and this higher average speed is adjusted so that a card fed from the hopper 28 arrives with its first row of data positions at the processing station 36 at the beginning of the next operating cycle. Assuming that the high speed rollers 34 are driven at a constant speed, a card fed from hopper 28 must reach the leftmost set of rollers 34 at a fixed point in the operating cycle if system timing is to be preserved. This requires that the card be fed out of the hopper 28 at a fixed time in the operating cycle.

Figure 3:
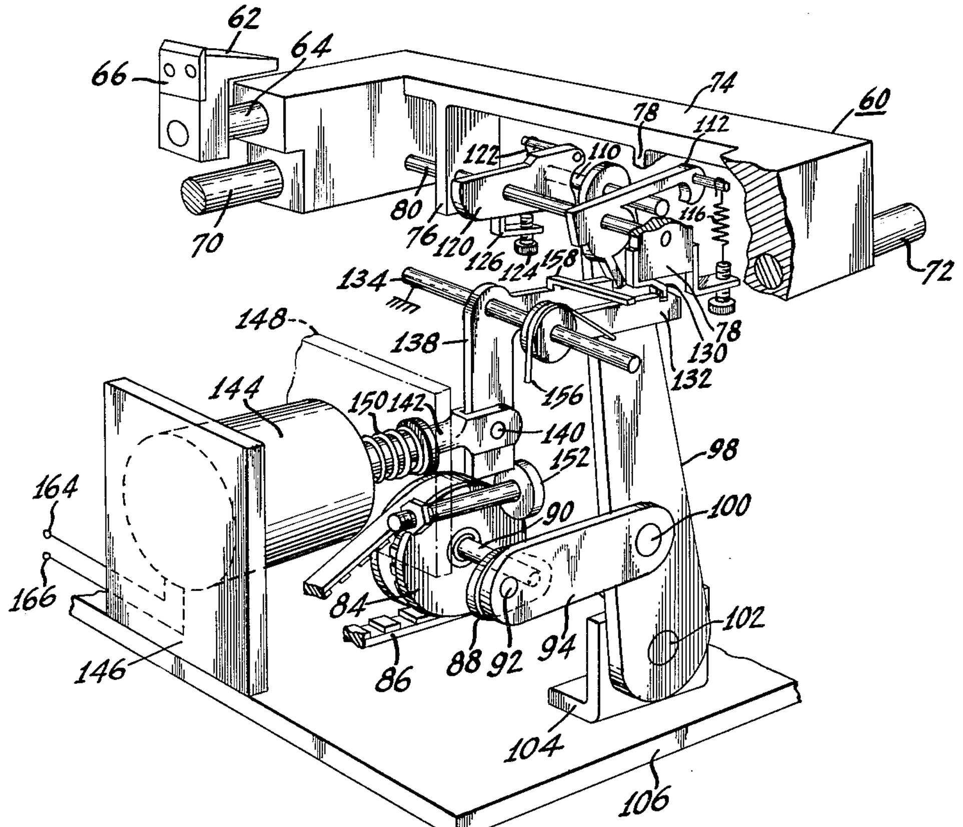
FIGURE 3 is a view in perspective of a picker assembly suitable for use in the demand feed system of FIGURE 2.

A suitable demand feed picker assembly 30 for use in the FIGURE 2 system is illustrated in FIGURE 3. The picker assembly includes a substantially U-shaped carriage 60 which is arranged to reciprocate back and forth beneath the hopper 28 (FIGURE 2). A first card picker device 62 is mounted on a post 64 which extends from the left-hand arm of the carriage 60. A picker knife 66 is adjustably attached at the rear of the picker device 62 and extends slightly above the picker device 62 an amount sufficient to engage the bottom card in the hopper. The right-hand arm of the carriage 60 is broken away in order to show some of the important features of the assembly. It will be understood, however, that a second picker knife assembly is mounted on a post which extends from the back of the right arm of the carriage 60. The bottom plate of the hopper has cut-out portions for receiving the picker knife assemblies.

Carriage 60 is slidably mounted on bearings on a pair of fixed shafts 70, 72 which are supported at both ends, by means not shown. The carriage 60 has a cross-piece 74 connecting the side arms and integral therewith. A second pair of arms 76, 78 extends vertically downward from the cross-piece 74 between the side arms. A portion of the vertical arm 78 is broken away for clarity of drawing. Arms 76 and 78 support a rod 80 on which certain parts of the picker drive mechanism are pivotally mounted. Drive power is supplied to the mechanism by means of a notched pulley 84 which may be driven by a notched timing belt 86 from the master drive 54 (FIGURE 2). A bell crank 88 is mounted on the end of the pulley shaft 90. A crank pin 92 is connected eccentrically to the web 88 at a point displaced from the shaft 90. This crank pin 92 moves in a circular path as the web 88 is rotated by the shaft 90.

A crank link 94 has one end connected to the crank pin 92 and is pivotally pinned at the other end to a drive link 98 by means of a pin 100. One end of the drive link 98 is pivotally mounted on a pin 102 secured to a bracket 104. Bracket 104 is mounted on a base plate 106. The end of the crank link 94 pinned at the crank pin 92 moves eccentrically when driven by the shaft 90 and causes the drive link 98 to oscillate back and forth. A latch pin 110 projects from either side of the drive link 98 at the upper end thereof and traces a curvilinear path as the drive link 98 oscillates.

A substantially L-shaped latch member 112 is mounted on the rod 80 carried by the vertical arms 76, 78. The right end of the latch member 112, as viewed in the drawing, is hook-shaped for engaging the forward surface of the latch pin 110. A bias spring 116 urges the latch member 112 clockwise into a position whereat it may engage the pin 110. This position is termed the "pin engaging position." A stop member 120 also is pivotally mounted on the rod 80 between the vertical arms 76, 78. The forward or right-hand end of the stop member 120 is recessed for sure engagement with the latch pin 110. This stop member 120 is urged in a clockwise direction by a spring 122 connected to an adjustable screw 124. The screw 124 is carried by a bracket 126 secured to the forward end of the vertical arm 76. The drive link 90 oscillates back and forth in a vertical plane which is parallel to, and approximately midway between, the latch member 112 and the stop member 120.

The carriage 60 normally is fixedly held in a "home" position, as follows. A catch 130 is rigidly secured to the rear of the vertical arm 78. A carriage latch 132, pivotally mounted on a pin 134, has a notch for engaging and holding the free end of the catch 130. The pivot pin 134 is fixedly held at either end by means (not shown). A linkage 138 also is pivotally mounted on the pin 134, and has its right-hand end holding the latch member 112 cocked in a counterclockwise direction when the catch 130 is fixedly held by the carriage latch 132. The latch member 112 then is pivoted out of the path of the latch pin 110, whereby the carriage remains in the home position, and no cards are fed out of the hopper by the picker knife 66.

The other end of the linkage 138 is connected by a pin 140 to the plunger 142 of a solenoid 144. The solenoid 144 is secured to a bracket 146 mounted on the base plate 106, and the plunger 142 projects through an aperture in another bracket 148. A compression spring 150 surrounds that portion of the plunger 142 between the solenoid 144 and the bracket 148 and urges the linkage 138 in a counterclockwise direction when the solenoid 144 is de-energized. An adjustable stop member comprising a screw 152 limits the counterclockwise rotation of the linkage 138. Spring 156 normally urges the carriage latch 132 in a counterclockwise direction. An arm 158, projecting transversely from the pivotable linkage 138, is provided for rotating the carriage latch 132 in a clockwise direction when solenoid 144 is energized.

In the operation of the picker assembly, the solenoid 144 normally is de-energized, pivotable linkage 138 is in the counterclockwise position, and the carriage latch 132 is in the counterclockwise position in engagement with the catch 130. Latch member 112 is cocked in the counterclockwise direction. Drive link 98 oscillates back and forth, but does not engage and drive the carriage 60 because the latch member 112 is pivoted out of the path of the latch pin 110. Accordingly, carriage 60 remains in a stationary "home" position and no cards are fed out of the input hopper.

Demand feed signals are supplied to the solenoid 144 by way of a pair of leads 164, 166. These signals may be supplied, for example, by the computer 46 (FIGURE 2). In response to a demand feed signal, the solenoid 144 becomes energized and pulls in the plunger 142. Pivotable linkage 138 pivots clockwise on the pin 134 and releases the lower end of the latch pin 112. Arm 158 forces the carriage latch 132 to pivot in the clockwise direction and release the catch 130. Latch member 112 is rotated in the clockwise direction, by spring 116 into the path of the latch pin 110. Assuming that the latch pin 110 is to the right of the latch member 112 when the solenoid 144 becomes energized, the latch pin 110 engages the forward end of the latch member 112 when the drive link 98 moves to the left. The forward end of the latch pin 112 is curved so that the latch pin 110 may force the latch member 112 to move counterclockwise against the bias of the spring 116. Latch member 112 is pivoted clockwise after the latch pin 110 has moved to the left of the hook-shaped end of the latch member 112. The carriage 60 is moved to the right by the force of the latch pin 110 against the forward end of the latch member 112 when the drive link 98 next moves to the right. A card is then fed out of the hopper by the picker knives 66. On the return stroke of latch pin 110, the latch pin engages the forward, recessed surface of stop member 120 and drives the carriage to the home position. Latch pin 112 and stop member 120 together act as a floating link to convert the curvilinear motion of latch pin 110 into rectilinear motion for the carriage 60.

Drive to pulley 84 from the master drive 54 (FIGURE 2) is arranged so that the drive link 98 operates through one cycle as the processing station 36 (FIGURE 2) undergoes a complete operating cycle. Accordingly, one card may be fed out of the hopper by the picker assembly of FIGURE 3 during each operating cycle of the processor 36. Moreover, a card is only fed out of the hopper in response to a demand feed signal supplied to the solenoid 144. Since it is the drive link 98 which drives the carriage 60, and since drive link 98 is operated in timed relation to the processing station, it may be seen that the particular time of arrival of the demand feed signal is not critical, provided the signal arrives before the drive link 98 begins its forward stroke. This allows some flexibility in the decision making time of the computer without affecting the system timing. Also, the high speed rollers 34 may be driven at constant speed since they always receive a card from the hopper 28 at a fixed point in an operating cycle.

Figure 4:
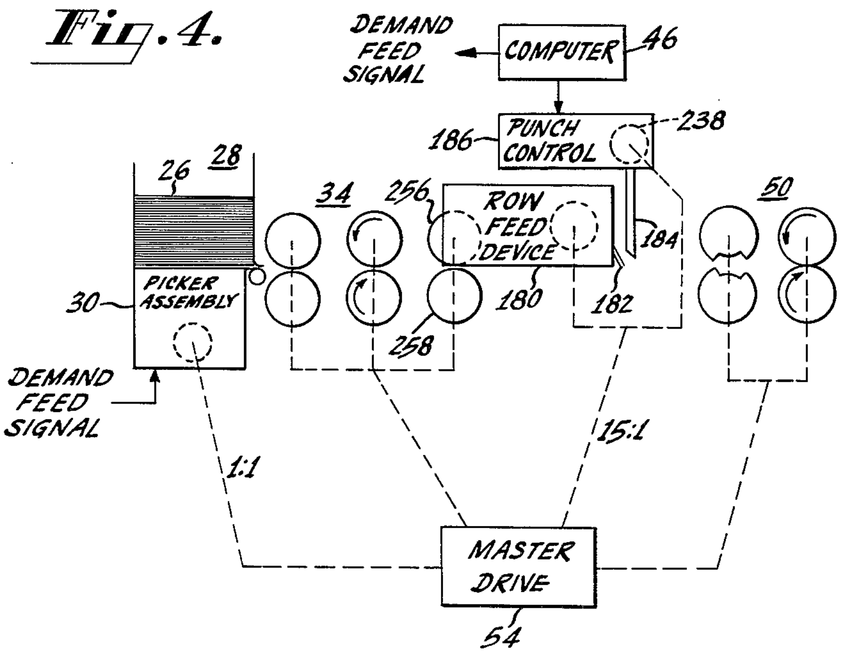
FIGURE 4 is a schematic diagram of still another demand feed system according to the invention which employs a feed device for moving the document through the processing station in step as is common in card and printing systems.

A schematic diagram of another type of document handling system according to the invention is illustrated in FIGURE 4. Portions of the FIGURE 4 system are similar to portions of the FIGURE 2 system and are designated by like reference characters. The system of FIGURE 4 differs from that of FIGURE 2 primarily in the processing station and the means for moving a document or record card through the processing station.

In FIGURE 4, cards are moved out of hopper 28 selectively, on demand, by a picker assembly 30 and fed by high speed rollers 34 to a row-feed device 180, to be described. The picker assembly may be of the type illustrated in FIGURE 3 and described hereinabove. Projecting from the right-hand side of the row-feed device 180 are stop means 182, such as brushes, which engage the card being fed by the high speed drive means 34 and stop the card after the card moves past the last set of high speed rollers 256, 258. Row-feed device 180 moves the card step-wise, row-by-row, past a set of punches 184 which are aligned parallel to the rows of the card being fed. The punches 184 are operated selectively by a punch control 186 in accordance with information received from a computer 46, or other suitable input device. Row-feed device 180 operates in timed relation with the punch control 186, whereby rows of data positions on a card always are presented to the punches 184 at the proper times in the operating cycle. Low speed rollers 50 engage the card, after its last row of data positions has been processed, and may move the card to an output stacker (not shown). The leftmost pair of rollers 50 are split rollers for reasons which will become apparent as the discussion proceeds.

Row-feed device 180 is driven mechanically from the master drive 54. The punch control 186 also may be driven mechanically from the master drive 54, depending upon the type of punch control. In any event, the punch control 186 is operated in fixed time relation to the master drive 54. It is assumed that an operating cycle has 15 distinct steps, as illustrated in FIGURE 1. Accordingly, the ratio of drive supplied to the punch control 186 and row-feed device 180 to that of the picker assembly 30 is 15:1, since the picker assembly 30 operates only once for each cycle of operation of the processing station.

One example of a suitable row-feed device 180 is illustrated in FIGURES 5–8. In the various views, a hollow housing 200 serves as a support for the various component parts of the device. The housing 200 has threaded apertures 202 in its top surface whereby the housing may be bolted to the main frame of the machine.

Figure 5:
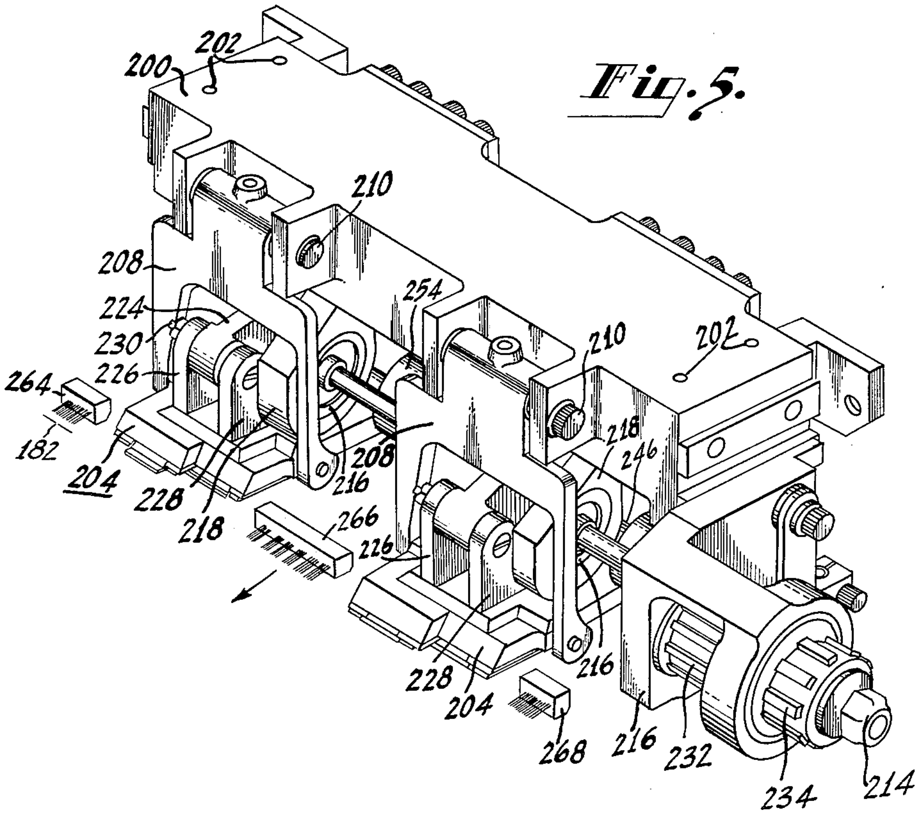
FIGURE 5 is a view in perspective of one type of row-feed device which may be used in the system of FIGURE 4.

Each of a pair of pawl frame assemblies 204 is suspended from the housing 200 by means of a leaf spring 206 (FIGURE 7) and an inverted U-shaped link 208 (FIGURE 5). Each leaf spring 206 is rigidly affixed at its top to the rear surface of the housing 200, and is rigidly supported at its bottom end to the rear of one of the pawl frame assemblies 204. Each U-shaped link 208 is pivotally mounted at its top end on a pin 210 which extends through projections from the front surface of the housing 200. The free end of each arm of a link 208 is pivotally pinned to a different side of a pawl frame assembly 204. Each pawl frame assembly 204 carries twelve spring biased pawls 212, best seen in FIGURES 6 and 8. The springs 213 are compression springs which normally bias the exposed ends of the pawls away from the pawl frame assembly 204. The pawls 212 of each assembly are arranged in two columns (FIGURE 6) and are staggered for purposes of constructional convenience. The distance between the leading or front edge of any pawl and the leading edge of an adjacent pawl in the other column is made equal to the distance between center lines of adjacent rows of data positions on the card or document being fed by the pawl assembly.

A first main shaft 214 rotates in bearings 216 housed in a pair of journals 218 mounted on the bottom of the housing 200. The journals 218 may be cast integral with the housing 200. Shaft 214 has two eccentrical, axial portions 220 (FIGURE 7), each located centrally with respect to a different pawl frame assembly 204. Surrounding a portion of each eccentric section is a ball bearing 222 housed within the free end of a crank link 224. The other end of each crank link 224 is pivotally mounted on a pin 230 carried by a pair of upstanding arms 226, 228 on the top surface of a pawl frame assembly 204. The eccentric portions of the shaft 214, upon rotation, impart a reciprocating, essentially harmonic and translatory motion to the two pawl frame assemblies 204 by means of crank links 224.

Two notched timing wheels 232, 234 are mounted on the back end of the shaft 214 at points extending beyond the housing 200. These wheels 232, 234 may be keyed to, or sweated on, the shaft 214. A notched timing belt (not shown) may be coupled between one of the wheels 232, 234 and the master drive 54 (FIGURE 4). A second notched timing belt (not shown) may couple the other one of the wheels 232, 234 and a notched wheel mounted on the shaft 238 of the punch mechanism (FIGURE 4), and be driven by that one of the wheels 232, 234. The notched wheel (not shown) which drives the shaft 238 of the punch mechanism is arranged to have the same diameter as the drive wheel 232, 234, whereby shaft 238 is driven through one revolution while the pawl frame assemblies 204 undergo one complete cycle of reciprocation.

Figure 6:
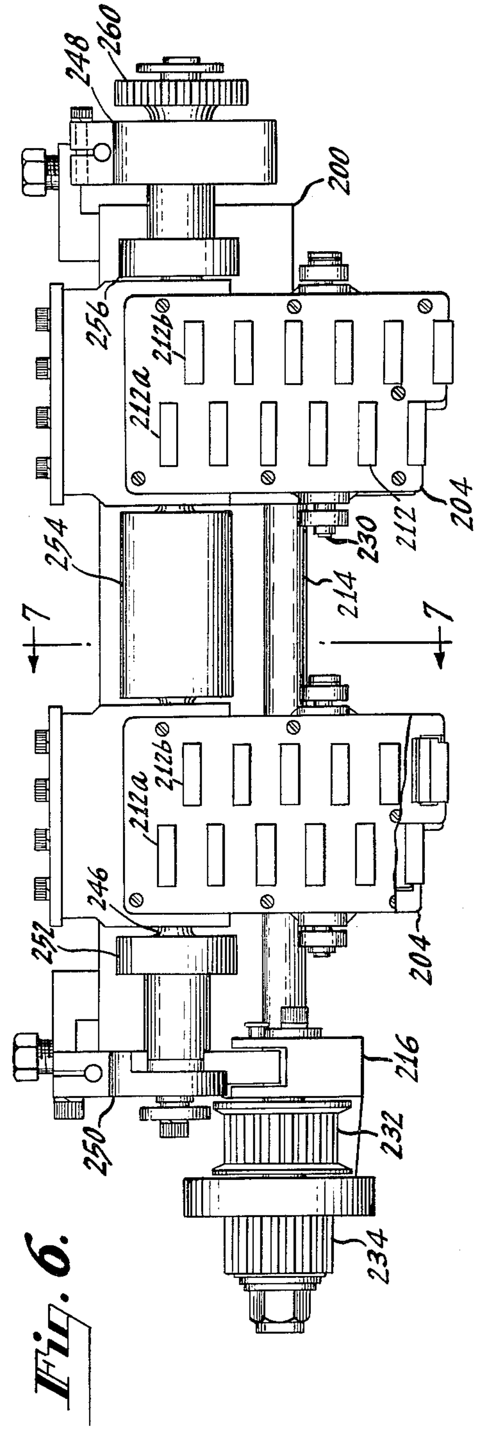
FIGURE 6 is a bottom view of the row-feed device.

A second shaft 246, parallel to the first shaft 214, rotates in bearings housed in supports 248, 250 mounted on the housing 200. Keyed to shaft 246, or integral therewith, are three drive rollers 252, 254, 256 (FIGURE 6). Roller 254 is located between the pawl frame assemblies 204, and rollers 252 and 256 are each located on the outside of a different pawl frame assembly 204 near opposite ends of shaft 246. A gear wheel 260 is keyed to shaft 246 at one end and may be driven by a mating gear (not shown) from the master drive 54 (FIGURE 4). The gear 260 also may drive a mating gear keyed to the shaft which drives rollers 258 (FIGURE 4) mating with the rollers 252, 254, and 256.

Fixedly mounted to the main frame of the machine, at the forward side of the row-feed device 180, are three brush assemblies 264, 266, 268 (FIGURE 5). Brushes 182 project downwardly at an angle from these brush assemblies 264, 266, 268, as best seen in FIGURES 5 and 7.

In the operation of the row-feed device, a record card, of the type described previously and having twelve rows of data storage positions, is fed from the input hopper 28 (FIGURE 4) to the rollers 252, 254, 256 by high speed means such as the first two sets of rollers 34 (FIGURE 4). The rollers 252, 254, 256, and the rollers 258 mating therewith drive the card at high speed through the channel, between card supporting plate 280 and the bottoms of the pawl frame assemblies 204, and into the brushes 182. Brushes 182 stop the card as the card is moved forward out of engagement with the rollers 252, 254, 256, 258. The brushes 182 and rollers 252, 254, 256, and 258 are so located relative to each other and to the pawl frame assemblies 204 that the card fed by these rollers is stopped with its trailing edge located in the vicinity of the rearmost pawls 212*a* (FIGURE 6). The channel aforementioned is only slightly higher than the thickness of a record card, whereby the record card forces the pawls 212 into the pawl frame assemblies against the bias of springs 213. It should be noted that the card supporting plate 280 may extend the length of the machine from the input hopper 28 to the output hopper. In the latter case, cutouts are provided in the plate 280 for receiving the bottom rollers.

Figure 7:
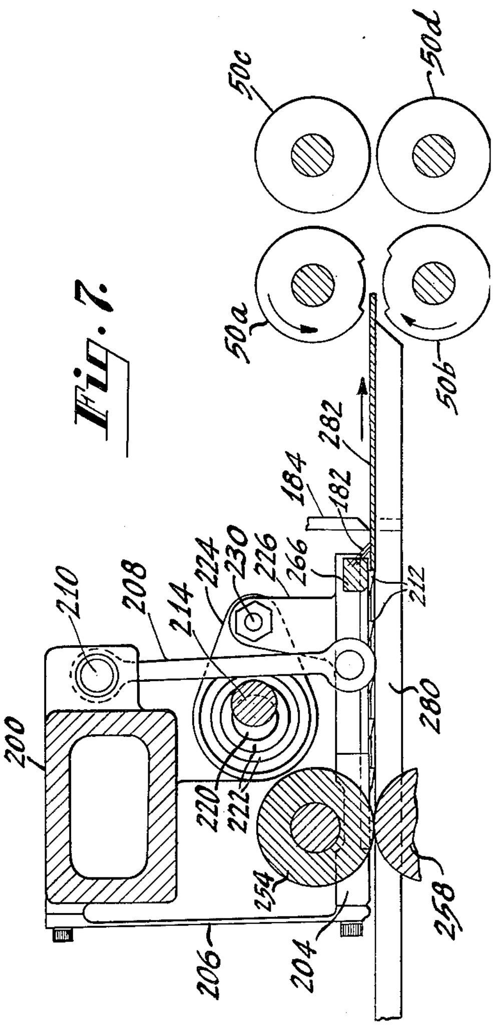
FIGURE 7 is a side elevation view in cross-section taken along the lines 7—7 of FIGURE 6 and including, in addition, certain of the components shown in FIGURE 4.

When the pawl frame assemblies 204 are next moved to the left, to the position shown in FIGURE 7, by the eccentric 220 and link 224, the rearmost pawls 212*a* clear the trailing edge of the card and are forced in the downward direction by the associated springs 213. These pawls 212*a* engage the trailing edge of the card and move the card to the right when the pawl frame assemblies 204 are next reciprocated to the right by the eccentric. Assuming that the distance between the center lines of adjacent rows of data on the card is 0.25 inch, the total translatory motion of the pawl frame assemblies 204 may be designed to be between 0.27 and 0.28 inch, corresponding to the intended row division of the cards plus a slight overtravel. This overtravel occurs at the end of the rearward stroke to allow the next set of pawls to clear the trailing edge of the card.

The punches 184 are positioned relative to the row-feed device so that the first row of data storage positions of the card is positioned under the punches 184 by the rearmost pawls 212*a*. Shaft 238 in the punch assembly is operated in timed relation to the movement of the pawl frame assemblies so as to drive selected punches 184 and perforate the card at selected points in the first row at that time.

Figure 8:
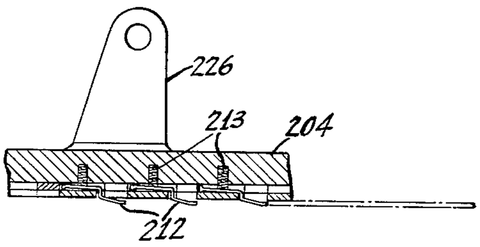
FIGURE 8 is a partial view in cross-section of a pawl frame assembly.

Meanwhile, shaft 214 continues to rotate and drive the eccentric. The pawl frame assemblies 204 reciprocate in the back direction (to the left as viewed in FIGURE 7). The second set of pawls 212*b* then clears the trailing edge of the record card, and the pawls 212*b* are forced in the downward direction toward the card supporting plate 280 by means of the associated bias spring 213 (FIGURE 8). The leading edges of the pawls 212*b* engage the trailing edge of the card, as the pawl frame assemblies 204 next move to the right, and drive the card 0.25 inch. The second row of data storage positions of the card then is positioned beneath the punches 184.

The record card 282 continues to be moved row-by-row by the pawls 212 until the last row of data storage positions of the card 282 is presented to the punches 184. The first set of low speed rollers 50*a*, 50*b* is positioned to engage the card 282 after the last row of storage positions is selectively punched. These rollers 50*a*, 50*b* are driven from the master drive 54 (FIGURE 4) so as to turn through one revolution while the row-feed device undergoes a complete cycle of operation. A complete cycle of operation may comprise 15 revolutions of the shafts 214 and 238 in the row feed device and punch mechanism. A complete operating cycle of the row-feed device and punch provides for moving a complete record card past the punches and provides for a desired intercard spacing during which a decision may be made to call, or not to call, the next card from the input hopper.

The low speed rollers 50*a*, 50*b* are spaced from the punches 184 such that the forward end of the card 282 would normally be engaged by the rollers 50*a*, 50*b* when the last row of data positions of the card 282 is in punch position. The rollers 50*a*, 50*b* are slit, as shown in FIGURE 7, so that these rollers 50*a*, 50*b* do not engage the card 282 until after the last row has been punched. Rollers 50*a*, 50*b* then engage the card and move the card to rollers 50*c*, 50*d*.

Figure 9:
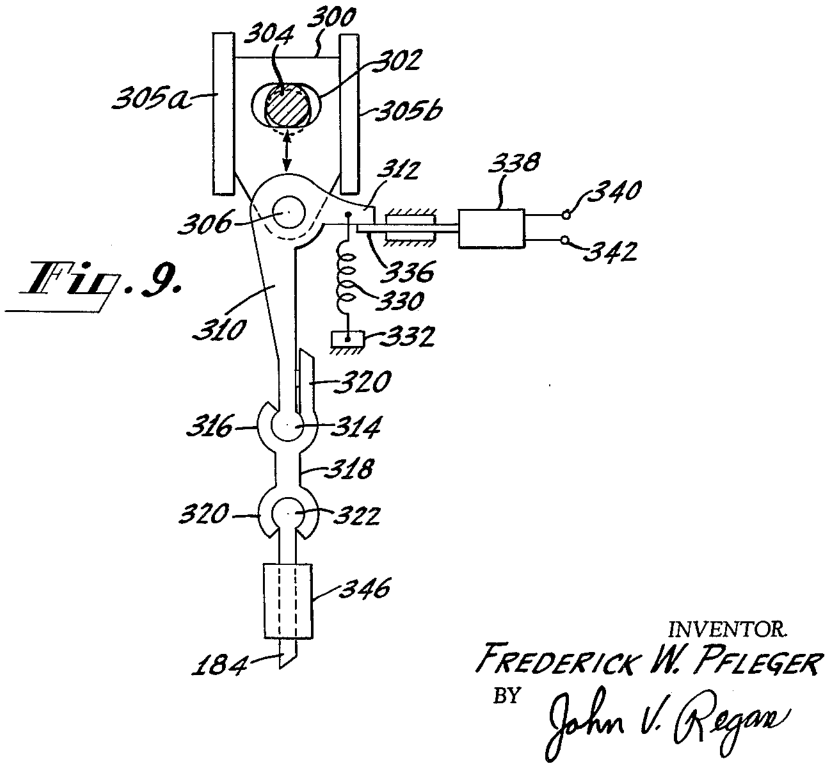
FIGURE 9 is a view in side elevation of a suitable punch mechanism and control for use in the FIGURE 4 system.

A suitable punch control and actuator is illustrated in FIGURE 9. A drive link 300 has an aperture 302 therein for receiving an eccentric 304, which may be driven by the shaft 238 (FIGURE 4). The link 300 is constrained by walls 305*a*, 305*b* to move up and down when driven by the eccentric 304. A pivot pin or shaft 306, common to all of the individual punch drive mechanisms to be described, projects from the drive link 300. Each punch linkage includes a first toggle arm 310 pivotally mounted on the shaft 306 and having a stop arm 312 extending substantially at a right angle from the main body of the toggle arm 310. The lower end of the arm 310 terminates in a disk-shaped pivot 314 which is surrounded by an upper yoke portion 316 of a second toggle arm 318. The second toggle arm 318 has yoke portions at both ends thereof. The upper yoke 316 extends on one side to form an elongated stop brace 320. The disk 314-yoke 316 combination acts as a kneejoint and flexes in a direction determined by, and in the same direction as, the location of the stop brace 320. The other end of the second toggle arm 318 terminates in a second yoke 320 which is fitted about a pivot disk 322 at one end of a punch 184.

A bias spring 330 is fastened at the outer end of the stop arm 312 and tends to pull the arm 312 in a downward direction. The spring 330 is anchored to a fixed block 332. The plunger 336 of a punch solenoid 338 engages the bottom edge of the stop arm 312 when the solenoid 338 is de-energized.

In the operation of the punch, the plunger 336 normally engages the stop arm 312. So long as the solenoid 338 remains de-energized, the first toggle arm 310 is caused to pivot counterclockwise about the pivot shaft 306 and the point of contact of the stop arm 312 and plunger 336, as the reciprocating driving link 300 moves in a downward direction. When first toggle 310 rotates in the counterlockwise direction, second toggle link 318 is driven in the clockwise direction about the disk 322. This breaks the two kneejoints 314–316 and 320–322, whereby insufficient drive is transmitted to the punch 184 for moving the punch 184 against the record card.

When perforation is desired, a signal is supplied to the leads 340, 342 of the solenoid 338 and energizes the solenoid. Plunger 336 then is pulled into the solenoid 338 and out of contact with the stop arm 312. As the reciprocating link 300 moves in the downward direction, spring 330 tends to rotate the first toggle 310 in the clockwise direction. However, stop arm 320 prevents rotation of the first toggle 310 and keeps the kneejoint 314–316 in a straight, locked condition. Second toggle 318 also is maintained in a vertical condition, and the punch 184 is driven into the record card. The punch 184 is constrained to move in a vertical direction by the punch block 346.

What is claimed is:

1. In a document handling machine, the combination comprising:

a document processing station having a fixed operating cycle of T seconds measurable from a time when the processing station is conditioned to process the first line of data storage positions on a document;

relatively slow speed means for feeding documents through said station at an average speed of $$\frac{X}{T}$$

inches per second, where X is the dimension of a document in the direction of document feed plus the desired interdocument spacing;

an input hopper for storing documents to be fed to said station;

means for feeding a document out of said hopper selectively on demand, in response to a "demand feed" signal, at a time $T_a$ in one operating cycle of said station, said hopper being spaced from said station by a distance greater than $$\frac{(T-T_a)X}{T}$$

inches; and relatively high speed means for feeding the output document from said hopper to arrive with its first line of data storage positions at said station at the beginning of the next operating cycle.

2. In a document handling system, the combination comprising:

a document processing station having a fixed operating cycle of T seconds measurable from a time when the processing station is conditioned to process the first line of data storage positions on a document;

relatively slow speed means for feeding documents through said station at an average rate of $$\frac{X}{T}$$

inches per second, where X is the dimension of a document in the direction of document feed plus the desired interdocument spacing;

storage means for documents to be processed;

means for feeding a document out of said storage means selectively on demand, under control of a "demand feed" signal, at a time $T_a$ in one operating cycle of said station, said storage means being located from said station by a distance greater than $$\frac{(T-T_a)X}{T}$$

inches; and relatively high speed means for feeding the output document from said storage means to arrive at said station with said desired interdocument spacing.

3. A demand feed document system comprising:

a document processing station having a fixed time cycle of T seconds;

relatively slow speed means for feeding documents through said station at a first average speed of $$\frac{X}{T}$$

inches per second, where X is the dimension of a document in the direction of feed plus a desired interdocument spacing;

means selectively operable in response to a "demand feed" signal during one operating cycle of the station for feeding an input document to said station beginning at a time when the leading edge of said input document is at a greater distance than said normal interdocument spacing from the leading edge of the preceding document then at said station; and relatively high speed means for feeding said input document to said station at a greater average speed than said first average speed to arrive at said station with said desired interdocument spacing.

4. A demand feed document system comprising:

a document processing station having a fixed time cycle of T seconds, measurable from a time when the processing station is conditioned to process a given line of storage positions on a document;

relatively slow speed means for feeding documents through said station at a first average speed of $$\frac{X}{T}$$

inches per second, where X is the sum of the document dimension in the direction of feed plus a desired interdocument spacing;

means for feeding an input document to said station selectively, on demand, in response to a "demand feed" signal, beginning at a time $T_a$ in one operating cycle of said station when said given line of said input document is located at a distance greater than $$\frac{(T-T_a)X}{T}$$

inches from said station; and relatively high speed means for feeding said input document to arrive with its said given line of data storage positions at said station at the beginning of the next operating cycle.

5. A demand feed document system comprising:

a document processing station having a fixed timing cycle of T seconds, measurable from a time when the processing station is conditioned to process the first line of data storage positions on a document;

relatively low speed means for feeding documents through said station at an average speed of $$\frac{X}{T}$$

inches per second, where X is the dimension of a document in the direction of feed plus desired interdocument spacing;

an input hopper spaced from said station for holding documents to be processed;

picker means for feeding a document out of said hopper;

drive means for said picker having the same time cycle as said processing station;

means selectively operable in response to a "demand feed" signal for operatively connecting said drive means and said picker means to feed a document out of the hopper at a time $T_a$ in one operating cycle when the leading edge of the latter document is at a greater distance than said desired interdocument spacing from the trailing edge of the document then at said station; and relatively high speed means for feeding said latter document from said hopper to said station at an average speed greater than $$\frac{X}{T}$$

inches per second to arrive at said station with said desired interdocument spacing.

6. A demand feed document system comprising:

a document processing station having a fixed timing cycle of T seconds, measurable from a time when the processing station is conditioned to process the first line of data storage positions on a document;

relatively low speed means for feeding documents through said station at an average speed of $$\frac{X}{T}$$

inches per second, when X is the dimension of a document in the direction of feed plus desired interdocument spacing;

an input hopper spaced from said station for holding documents to be processed;

picker means for feeding a document out of said hopper;

drive means for said picker having the same time cycle as said processing station;

means selectively operable in response to a "demand feed" signal for operatively connecting said drive means and said picker means to feed a document out of the hopper at a time $T_a$ in one operating cycle, said hopper being spaced from said station by a distance greater than $$\frac{(T-T_a)X}{T}$$

inches; and relatively high speed means for feeding the output document from said hopper at a greater average speed than $$\frac{X}{T}$$

inches per second to arrive with its first line of data storage positions at said station at the beginning of the next operating cycle.

References Cited by the Examiner

UNITED STATES PATENTS

| | | | |
|---|---|---|---|
| 2,846,008 | 8/58 | Dickinson | 271—3 X |
| 2,947,358 | 8/60 | Hawxhurst | 271—4 X |
| 3,002,748 | 10/61 | Wheeler | 271—41 |

ROBERT B. REEVES, *Acting Primary Examiner.*

RAPHAEL M. LUPO, SAMUEL F. COLEMAN, *Examiners.*